Oct. 25, 1938.    S. C. BROWN    2,134,298
VARIATOR FOR WEIGHT INTEGRATING DEVICES
Filed Sept. 25, 1935    2 Sheets-Sheet 1
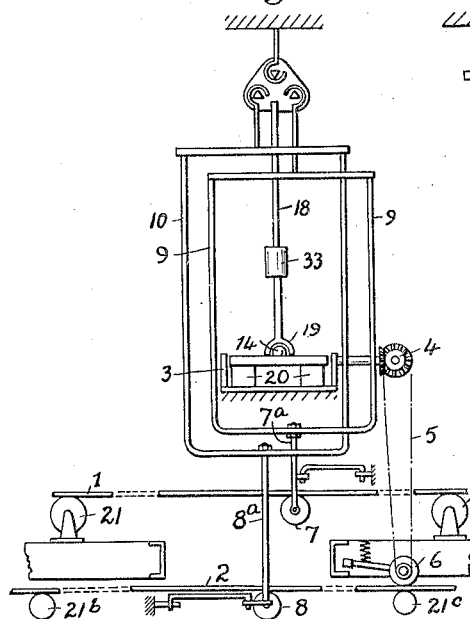
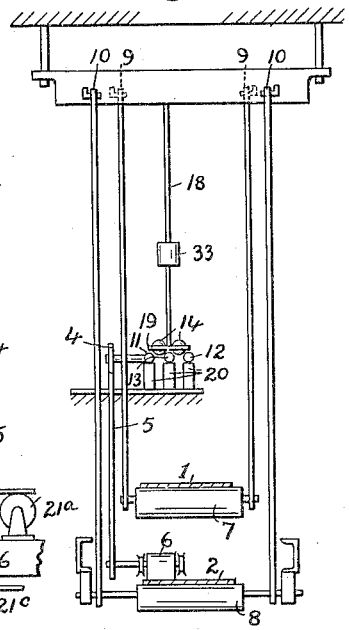
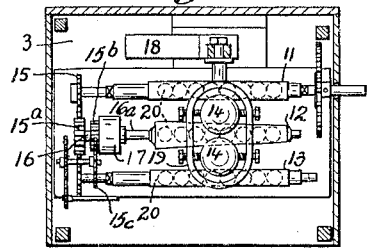
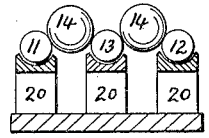
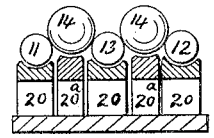
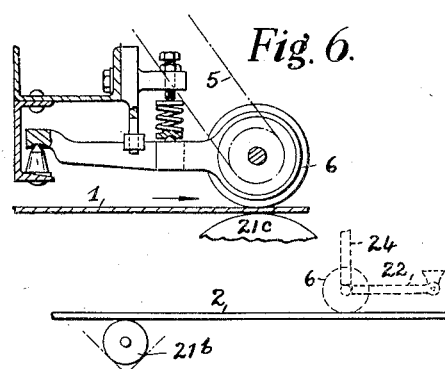
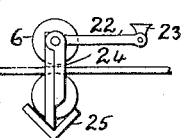
INVENTOR
Sidney Charles Brown
BY
Chatwin & Company
ATTORNEYS Oct. 25, 1938. S. C. BROWN 2,134,298
VARIATOR FOR WEIGHT INTEGRATING DEVICES
Filed Sept. 25, 1935 2 Sheets-Sheet 2
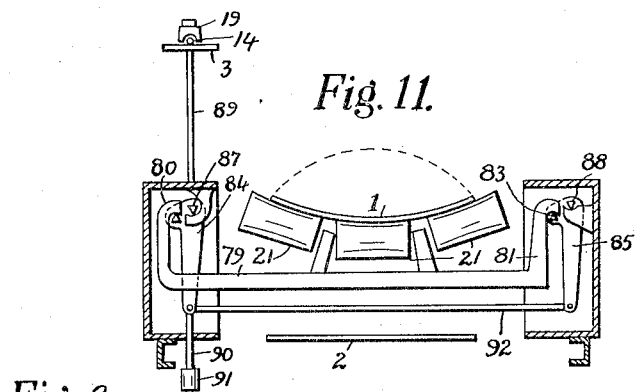
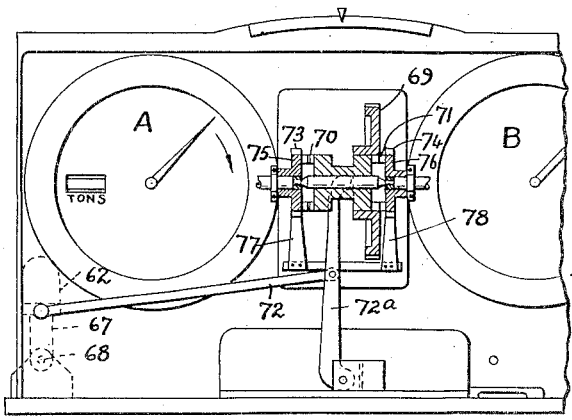
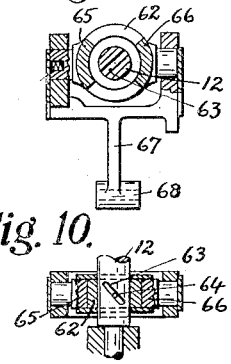
INVENTOR
Sidney Charles Brown
BY
Chatwin & Company,
ATTORNEYS Patented Oct. 25, 1938

2,134,298

UNITED STATES PATENT OFFICE 2,134,298

VARIATOR FOR WEIGHT INTEGRATING DEVICES

Sidney Charles Brown, London, England

Application September 25, 1935, Serial No. 42,022
In Great Britain October 2, 1934

4 Claims. (Cl. 74—198)

The invention relates to an automatic continuous weight integrator in which is employed an endless conveyor belt of a flat or troughed section, or linked buckets or the like and has for its primary object to provide an improved construction of such an apparatus wherein material travelling along a given section of the belt will be automatically weighed.

A further object of the invention is to provide in an improved weight integrating mechanism of the type above referred to, means continuously rotated at the appropriate speed which speed is varied, controlled and governed in an antifriction manner by the varying weight of material in transit over a selected length of belt such continuous rotation being operated by means of the variable speed frictional drive hereinafter described.

A further object of the invention is to provide a continuously rotating weight integrating mechanism comprising, in its elementary form, two shafts journalled to lie side by side the peripheral surface of one of such shafts being cylindrical and the other coned or tapered, the cylindrical shaft being driven positively in sympathy of the speed of the conveyor, the other or tapered shaft being passively driven at the same peripheral speed but at a variable speed of rotation by means of a ball lying in the valley between the said two shafts and in contact therewith, said ball transferring rotation from one shaft to the other, the variable speed of rotation, said speed being dependent upon the position occupied by said ball with respect to the diameter of the coned surface of the tapered shaft, said ball being rolled along said valley automatically by the weighing mechanism which responds to the applied load of material in transit. A still further object of the invention is to provide a continuously rotating weight integrating mechanism comprising two cylindrical driving shafts geared together to rotate in the same direction and a third coned or tapered shaft journalled to lie between the same, the cylindrical shafts being driven passively by twin balls and said cylindrical shafts being geared to one end of a differential, the tapered shaft being geared to the other end while the central part of said differential gear is geared to a weight totalizing register.

In order that the said invention may be more clearly understood and readily carried into effect I will now describe the same by way of example with reference to the accompanying drawings, in which:

Figure 1 is a diagrammatic side elevation of an apparatus constructed according to the present invention; Fig. 2 is an end view thereof; Fig. 3 is a plan of the gear driven by the conveyor belt for operating the registering mechanism; Fig. 4 is an end elevation thereof; Fig. 5 is a similar view to Fig. 4 illustrating a modification; Fig. 6 is a view illustrating the driving of the gear shown in Fig. 3; Fig. 7 represents a detail illustrating the means for calibrating the distance apart of the idlers supporting the weighing section of the belt or conveyor; Figs. 8 and 9 illustrate the employment of two registers, one for each direction of travel of the belt; Fig. 10 shows a section of a detail, and Fig. 11 illustrates the means employed for weighing the load on the bell crank levers.

Referring to the drawings, Figs. 1 and 2, 1 represents the upper weighing section of the belt, 2 represents the lower or return section thereof, 3 represents a variable speed driving gear (hereinafter described) which is driven through bevel or other gear 4 by a chain 5 from a spring or weight loaded pulley 6 driven by the belt 2 shown more particularly in Fig. 6, said pulley 6 being of a pre-determined circumference for the purpose hereinafter described.

The upper section 1 of the conveyor belt is supported by idler rollers or the like rotatably mounted in a fixed position in contact with the underside of the section 1 of the belt or conveyor and said idlers are mounted at a pre-determined distance apart to fix the length of the weighing section 1 of the belt.

The weighing operation is effected by means of rollers 7 and 8 the roller 7 being in contact with the under side of the belt section 1 whilst the roller 8 is in contact with the under side of the belt section 2 and said rollers are mounted at the lower ends of rods or bars 7ª, 8ª at their upper ends carried by yokes or frames 9 and 10 suspended from a suitable weight beam at either side of the fulcrum.

Referring now to Figs. 3 to 5 in which are illustrated a practical form of the integrating or variable speed frictional driving gear 3, referred to in Fig. 1, 11 and 12 represent cylindrical rollers mounted so as to lie parallel to one another and mounted between them is a tapered or conical roller 13, which is mounted so that the axis thereof lies parallel to the rollers 11 and 12.

The shafts 11 and 12 are driven positively in sympathy with the conveyor and the shaft 13 is driven passively at the same peripheral speed but at a variable speed of rotation by means of balls 14 lying in the valleys between the shafts 11, 12, and the tapered shaft 13 one of said balls 14 being in contact with and in the valley between the shafts 11 and 13 and the other in contact with and in the valley between the shafts 12 and 13.

The shafts 11 and 12 are geared together so as to rotate in the same direction by a train of gearing 15, the intermediate wheel 15$^a$ of which drives a short shaft 16 which is connected through a differential gear in a box 17 to the tapered roller 13 the axis of which is parallel to the rollers 11 and 12 in the horizontal plane. Differential gearing of this general type is quite common and has acquired a distinct status in the art, as is shown by U. S. Patents No. 1,839,354 of January 5, 1932, to Spath, No. 1,961,350 of June 5, 1934, to Grimsky, and No. 2,062,804, of December 1, 1936, to Brage. Differentials of this type comprise a rotative box or housing 17 into which two opposed shafts as 16, 16$^a$ enter from opposite sides, the shaft 16$^a$ constituting, in effect, an extension of the tapered roller 13. As long as these two shafts rotate at the same speed the housing 17 does not rotate, but any difference in speed of shafts 16, 16$^a$ results in rotation of box or housing 17, and this motion may be utilized for any desired purpose through gear 15$^b$ on the housing and the associated gearing 15$^c$ with which 15$^b$ meshes.

The balls 14 which lie in the valleys between the three rollers transmit the drive from the cylindrical rollers 11 and 12 to the tapered roller 13, said balls 14 thus acting as intermediate gear wheels for the tapered roller 13; therefore all three shafts rotate in the same direction.

18 represents a weighing arm which is oscillatable and is attached to the weighing beam hereinafter referred to. The balls 14 are enclosed or mounted on a yoke 19 which as shown in Fig. 3 is attached to the arm 18 and said balls 14 are thus traversed along the rollers as said arm oscillates. The diameter of the tapered roller 13 at the "zero" point, that is, when the belt or conveyor is unloaded, is the same as that of the outer rollers 11 and 12 and when the balls 14 are at this point, that is, the zero point the speed of all three rollers is the same.

The shaft 16 rotates at the same speed as the outer rollers 11 and 12 so that with the balls 14 the two shafts entering the differential gear-box rotate at the same speed, though in opposite directions. When the conveyor belt is empty or unloaded, therefore, the differential gear box 17 does not rotate and the counter hereinafter referred to is not in operation.

When weight passes over the weighing section 1 of the conveyor belt the arm 18 is deflected and the balls 14 are traversed along valleys between the rollers 11 and 13 and 12 and 13 and as the balls 14 act as intermediate gear wheels, as they are moved away from or towards the gear box 17, the speed of the tapered roller 13 will be increased or decreased. The gear box 17 therefore rotates and the speed thereof is thus varied and the counter driven from the gear box pinion 15$^b$ is operated at a rate proportional to the deflection of the weighing arm 18.

In order to prevent slip between the balls 14 and the rollers 11, 12 and 13, a strong magnetic field is employed to keep said balls 14 in contact with said rollers. The rollers 11, 12 and 13 and the balls 14 are preferably constructed of hardened rustless steel, and the spacing of the rollers 11, 12 and 13 and the diameter of the balls 14 are so proportioned that the balls 14 can almost pass through the gaps between said rollers. This arrangement gives a balanced wedge-action drive, the magnetic field providing an additional cohesive force.

As shown in Fig. 4 said magnetic field is obtained by placing a row of permanent magnets 20 under each roller 11, 12 and 13 the upper ends of the centre row being of opposite polarity to those of the outside rows.

In Fig. 5 magnets 20$^a$ are disposed under the balls 14 as well as under the rollers 11, 12 and 13 which accentuates the effects of preventing slip between the balls and the rollers.

In Fig. 7 is illustrated means employed for locating the distance apart of the idlers to determine the length of the weighing section of the belt or conveyor. The pulley 6 is therefore preferably calibrated to be of standard circumference such as say one foot and this pulley 6 is journalled and mounted in a frame 22 and is normally anchored by a pin or the like at 23. The pulley 6 complete with its frame 22 is detached from the anchor pin 23 so that it can be rolled along either section of the conveyor belt.

A straight edge 24 is attached axially with the pulley shaft so that it rotates with it. Also a centre square 25 is used to locate the axis of the idlers 21, 21$^a$, when the faces of said straight edge and centre square are coincident and vertical, the pulley 6 will be located for instance directly over the idler pulley 21$^c$. By removing the centre square the pulley 6 can now be rolled along the conveyor belt the requisite number of revolutions and the required position of the conveyor idler 21$^b$ located by means of the centre square. By this method the correct length of the weighing section of the belt or conveyor is established to suit that of the circumference of the driving pulley 6 to be used. The same applies to the idlers 21, 21$^a$.

The change over from one register to the other is automatic, operated from the shaft 12 on which is fitted a brake sleeve 62 provided with flanges and a slot 63 cut at an angle in the shaft 12 in which engages a pin or peg 64 carried by the brake sleeve 62. Permanently spring loaded brake shoes 65 and 66 are, as shown in Fig. 9, trunnioned in the lever 67 which is fulcrumed at 68. The counters of the dials A and B are operated by means of a sliding gear wheel member 69 which carries side teeth 70 and 71 on either side thereof. Wheels 75 and 76 are provided with coacting lateral or side teeth and teeth 73 and 74 are also provided on the peripheries thereof with which are adapted to engage, arms or detents 77, 78 the arrangement being such that when one detent 78 is in engagement with the peripheral teeth 74 of wheel 76 the other detent 77 is out of engagement with the peripheral teeth 73 of the wheel 75. The sliding of the wheel member 69 for effecting the change over from one dial to the other is effected by the lever 67 which is moved over in one direction or the other by the mechanism above described according to the direction of rotation of the driving shaft, through the connecting link 72 and arm 72$^a$ the end of which engages said wheel member 69.

In Fig. 11 is illustrated means for weighing the load on bell crank levers.

The top loaded section 1 of the conveyor belt is supported upon the troughed idlers 21 which are mounted upon the platform 79 which is sandwiched between the said top strand 1 and the return strand 2. The outer ends of the said platform 79 are provided with horns 80 and 81 which rest upon the knife-edges 82 and 83 of the respective bell crank levers 84 and 85 which are fulcrumed upon knife-edges 87 and 88 which are of sufficient length to prevent the said platform 79 from tipping sideways. A vertically extending arm 89 of the said bell crank lever 84 carries the fork 19 which embraces the ball 14 which is in driving contact with the shaft mechanism 11—12—13.

An extension 90 of the said bell crank lever 84 also carries the pendulum resistant 91 so that a varying load carried by the belt moves the said ball 14 along the valleys between the shafts.

With this arrangement the mechanism does not occupy space immediately above the belt and any width of belt can be accommodated by merely lengthening the tie rod 92 which connects the bell crank levers together. The fulcrum knife edges are prevented from travelling with the belt by means of suitable anti-friction stops which obviates the need for drag links customary with such weighers.

I claim:

1. In a variator of the character described, the combination with an elongated centrally disposed longitudinally tapered roller, of a cylindrical roller upon each of and having their longitudinal axes in parallelism with the axes of the tapered roller, a ball disposed between the tapered roller and each of the cylindrical rollers, means gearing the cylindrical rollers to turn together in the same direction, and means for simultaneously shifting said balls along said rollers, said balls being materially larger in diameter than the width of the spaces between said rollers to cause them to have a wedging action between their contacting rollers.

2. In a variator of the character described, the combination with an elongated centrally disposed longitudinally tapered metallic roller, of a cylindrical metallic roller upon each side of and having their longitudinal axes in parallelism with the axes of the tapered roller, a metallic ball disposed between the tapered roller and each of the cylindrical rollers, means gearing the cylindrical rollers to turn together in the same direction, means for simultaneously shifting said balls along said rollers, said balls being materially larger in diameter than the width of the spaces between said rollers to cause them to have a wedging action between their contacting rollers, and an elongated magnet disposed beneath each of said rollers in parallelism therewith for exerting a magnetic force between the rollers and balls.

3. In a variator of the character described, the combination with an elongated centrally disposed longitudinally tapered metallic roller, of a cylindrical metallic roller upon each side of and having their longitudinal axes in parallelism with the axes of the tapered roller, a metallic ball disposed between the tapered roller and each of the cylindrical rollers, means gearing the cylindrical rollers to turn together in the same direction, means for simultaneously shifting said balls along said rollers, said balls being materially larger in diameter than the width of the spaces between said rollers to cause them to have a wedging action between their contacting rollers, and an elongated magnet disposed beneath each of said rollers in parallelism therewith for exerting a magnetic force between the rollers and balls, said magnets having channeled upper faces partially embracing said rollers.

4. In a variator of the character described, the combination with an elongated centrally disposed longitudinally tapered metallic roller, of a cylindrical metallic roller upon each side of and having their longitudinal axes in parallelism with the axes of the tapered roller, a metallic ball disposed between the tapered roller and each of the cylindrical rollers, means gearing the cylindrical rollers to turn together in the same direction, means for simultaneously shifting said balls along said rollers, said balls being materially larger in diameter than the width of the spaces between said rollers to cause them to have a wedging action between their contacting rollers, a differential comprising a rotative gear box housing and a shaft projecting from each side of said box, one of said shafts being axially aligned with and constituting in effect an extension of the tapered roller, and the other shaft of the differential being connected to and driven from the train of gearing between the cylindrical rollers to rotate in a reverse direction to the tapered roller, the differential being of a type wherein the housing rotates at varying speeds determined by the relative speeds of the two shafts entering the same, and power transmitting means for taking power from the rotative housing.

SIDNEY CHARLES BROWN.